United States Patent
Haubursin et al.

[19]
[11] Patent Number: 6,115,779
[45] Date of Patent: Sep. 5, 2000

[54] INTERRUPT MANAGEMENT SYSTEM HAVING BATCH MECHANISM FOR HANDLING INTERRUPT EVENTS

[75] Inventors: Pierre P. Haubursin, Sunnyvale; Ching Yu, Santa Clara, both of Calif.

[73] Assignee: Advanced Micro Devices, Inc., Sunnyvale, Calif.

[21] Appl. No.: 09/234,456

[22] Filed: Jan. 21, 1999

[51] Int. Cl.[7] .................................................. G06F 13/24
[52] U.S. Cl. .................. 710/262; 710/260; 710/266; 710/49
[58] Field of Search .................................. 710/262, 260, 710/266, 49, 263–265, 268–269

[56] References Cited

U.S. PATENT DOCUMENTS

| | | | |
|---|---|---|---|
| 5,708,817 | 1/1998 | Ng et al. | 710/260 |
| 5,905,913 | 5/1999 | Garrett et al. | 710/49 |
| 5,941,964 | 8/1999 | Young et al. | 710/100 |

*Primary Examiner*—Ario Etienne

[57] ABSTRACT

An interrupt management system that enables a user to handle interrupt events either in a real time mode of operation, or in a batch mode of operation. In the real time mode, an interrupt request signal is asserted in response to each interrupt event. In the batch mode, an interrupt request signal is delayed until a predetermined number of interrupt events is detected, or until a predetermined time interval has elapsed since the last interrupt event is captured. In response to an interrupt event, the corresponding bit in an interrupt register is set to an active state. A control interrupt bit is provided in an interrupt control register for each interrupt to enable the activation of an interrupt request pin in response to the interrupt event. A batch enable bit is provided in a batch register for each interrupt event to enable the batching of the interrupt event.

17 Claims, 4 Drawing Sheets

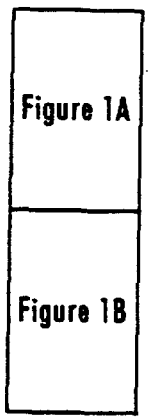

INTERRUPT MANAGEMENT SYSTEM HAVING BATCH MECHANISM FOR HANDLING INTERRUPT EVENTS

FIELD OF THE INVENTION

The present invention relates to data processing systems, and in particular, to a batch mechanism for handling interrupt events in a network controller.

BACKGROUND ART

The growth in computer applications that require heavy data traffic and the increasing availability of high-speed transmission lines and intelligent communication switches create a need for computer systems able to manage a huge amount of data at high rates. For example, high-speed communication networks may require a central processing unit (CPU) to be interrupted at rates of 20,000–100,000 interrupts per second in response to hundreds various events.

In a network controller chip, interrupt request signals to an external CPU may be produced to direct the CPU's attention to various events associated with data transmission and reception.

To prevent processing bottlenecks, the number of interrupt requests should be reduced. Accordingly, it would be desirable to create an interrupt system that batches interrupt events to reduce the total number of interrupt requests sent to the CPU.

DISCLOSURE OF THE INVENTION

Accordingly, a primary object of the present invention is to provide an interrupt management system for batching interrupt events to reduce the number of interrupt requests sent to a host.

The above and other advantages of the invention are achieved, at least in part, by providing an interrupt management system that comprises an interrupt register for storing an interrupt bit asserted in response to an interrupt event. A batch enable bit is provided for each interrupt event. A batch circuit produces an interrupt request signal sent to a host in response to the interrupt bit, when the batch enable bit is set to a first logic state. The interrupt request signal is delayed when the batch enable bit is set to a second logic state.

In accordance with a first aspect of the invention, the interrupt request signal may be delayed until a predetermined number of selected interrupt events is detected.

In accordance with another aspect of the invention, the interrupt request signal may be delayed until a predetermined time interval has elapsed since the interrupt event was detected.

In accordance with a further aspect of the invention, the interrupt management system may comprise an interrupt control circuit responsive to an interrupt control bit provided for the interrupt event. The interrupt control circuit prevents the interrupt bit from being supplied to the batch circuit when the interrupt control bit is set to a first logic state. However, the interrupt control circuit allows the interrupt bit to be supplied to the batch circuit when the interrupt control bit is set to a second logic state.

In accordance with a preferred embodiment of the invention, the interrupt control circuit may comprise an interrupt control register for supplying the interrupt control bit, and a first gate responsive to the interrupt bit and the interrupt control bit for producing a validated interrupt bit.

The batch circuit may comprise a batch register for supplying the batch enable bit, a batch event counter responsive to the validated interrupt bit for counting interrupt events, and a batch timer activated by the validated interrupt bit for determining a time interval that has elapsed since the interrupt event was detected. The batch circuit may comprise an OR gate responsive to signals provided by the batch event counter and the batch timer for producing the interrupt request signal.

In accordance with a method of the present invention, the following steps are carried out to support interrupt management:

asserting an interrupt signal in response to an interrupt event, producing an interrupt request signal sent to the host in response to the asserted interrupt signal when a batch enable signal is in a first logic state, and delaying the interrupt request signal when the batch enable signal is in a second logic state.

Further, an interrupt masking signal may be supplied to prevent the interrupt request signal from being produced.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIGS. 1A and 1B show block diagrams illustrating an exemplary network interface, which may be used for implementing the present invention.

BEST MODE FOR CARRYING OUT THE INVENTION

The present invention will be described with the example of a network interface in a packet switched network, such as an Ethernet (IEEE 802.3) network. It will become apparent, however, that the present invention is applicable to any output driver in any data processing system.

Figure 1B:
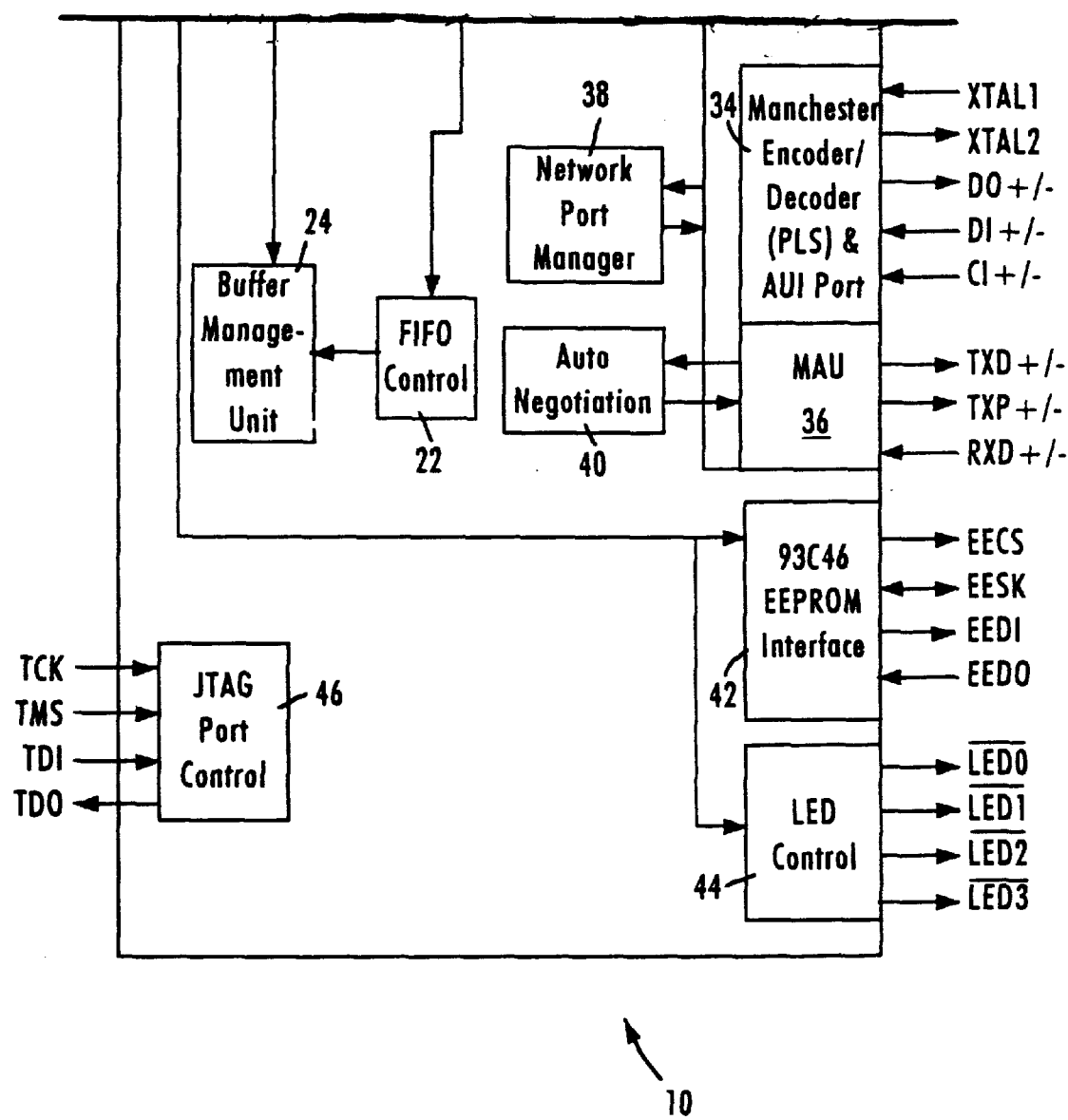

FIG. 1 is a block diagram of an exemplary network interface 10 that accesses the media of an Ethernet (ANSI/IEEE 802.3) network.

The network interface 10, preferably, a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface portion 20. The PCI bus interface unit 16 may provide an interface with an external CPU or other host via the PCI local bus. The PCI bus interface unit 16 may include a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

In accordance with the PCI local bus specification, revision 2.1, the PCI bus interface unit 16 has an interrupt request output INTA/used for supplying the CPU or a host with an interrupt request signal. The network interface 10 produces the interrupt request signal to indicate that one or more of status flags are set. The status flags may represent such events as receive or transmit interrupt, system error, user interrupt, etc.

A Control and Register (CAR) block 17 contains registers that support interactions between the PCI bus interface 16 and other blocks of the network interface 10. The CAR block 17 has a register interface to the PCI bus interface 16 to allow read and write accesses to the registers. For example, the CAR block comprises a command register that decodes commands from the CPU and sends command signals to other blocks of the network interface 10. The CAR block 17 is responsible for interrupt generation and batching. The CAR block 17 contains counters and timers for controlling interrupts and providing information to the CPU regarding latency and access time. Also, the CAR block 17 generates reset signals supplied to all other blocks of the interface 10, and provides input/output control.

The memory portion 18 includes a 16-bit SRAM implemented directly on the network interface chip 10. According to the disclosed embodiment, the SRAM 18 may be accessed in a random access manner under the control of a first in, first out (FIFO) control unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory controller 22 are shown as discrete components, the two units may be integrated to form a memory management unit controlling all transfers of data to and from the memory unit 18.

The network interface portion 20 includes a media access control (MAC) core 26, a general purpose serial interface (GPSI) 28, a media independent interface (MII) 30 for connecting to an external 10 Mb/s or 100 Mb/s physical transceiver (PHY), an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking is performed in accordance with the IEEE 802.3 protocols, and may include link and programming information exchange at the MII layer using a management data clock (MDC), and management data input/output (MDIO) paths defined in the IEEE 802.3 standard.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface status registers (not shown). The network interface 10 also includes an IEEE 1149.1-compliant JTAG boundary scan test access port interface 36.

The EEPROM interface 42 connects to an EEPROM on either a network interface adapter card or the motherboard of the host computer via a serial interface link. The EEPROM (not shown in FIG. 1) will be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down.

As discussed above, the PCI bus interface unit 16 has an interrupt request output INTA/for supplying an external CPU or other host with an interrupt request signal. An interrupt management block may be provided in the CAR block 17 for capturing various interrupt events that may occur in the network interface 10, and producing an interrupt request signal to report the interrupt events to the CPU. For example, the interrupt management block may handle various transmit and receive interrupt events. Among transmit interrupt events are transmit descriptor interrupts asserted when a transmit descriptor has been processed, free bytes interrupts asserted when a certain number of bytes become free in the transmit buffer 18b, transmit frame complete interrupts indicating that a transmit frame has been either successfully transmitted to the network or aborted due to error conditions, etc. Receive interrupt events include receive frame complete interrupts indicating that an entire receive frame is processed, receive out-of-descriptor interrupts asserted when the network adapter wants to transfer receive data to the system memory but no receive descriptor is available, etc.

In accordance with the present invention, the interrupt management block may be programmed to operate in a real time mode, and in a batch mode. In the real time mode of operation, the interrupt request signal may be supplied to the INTA/pin in response to each interrupt event. In the batch mode of operation, the interrupt management block provides the interrupt request signal after a preset number of interrupt events are detected, or a preset time period has elapsed since the last interrupt request signal was sent to the CPU.

Figure 2:
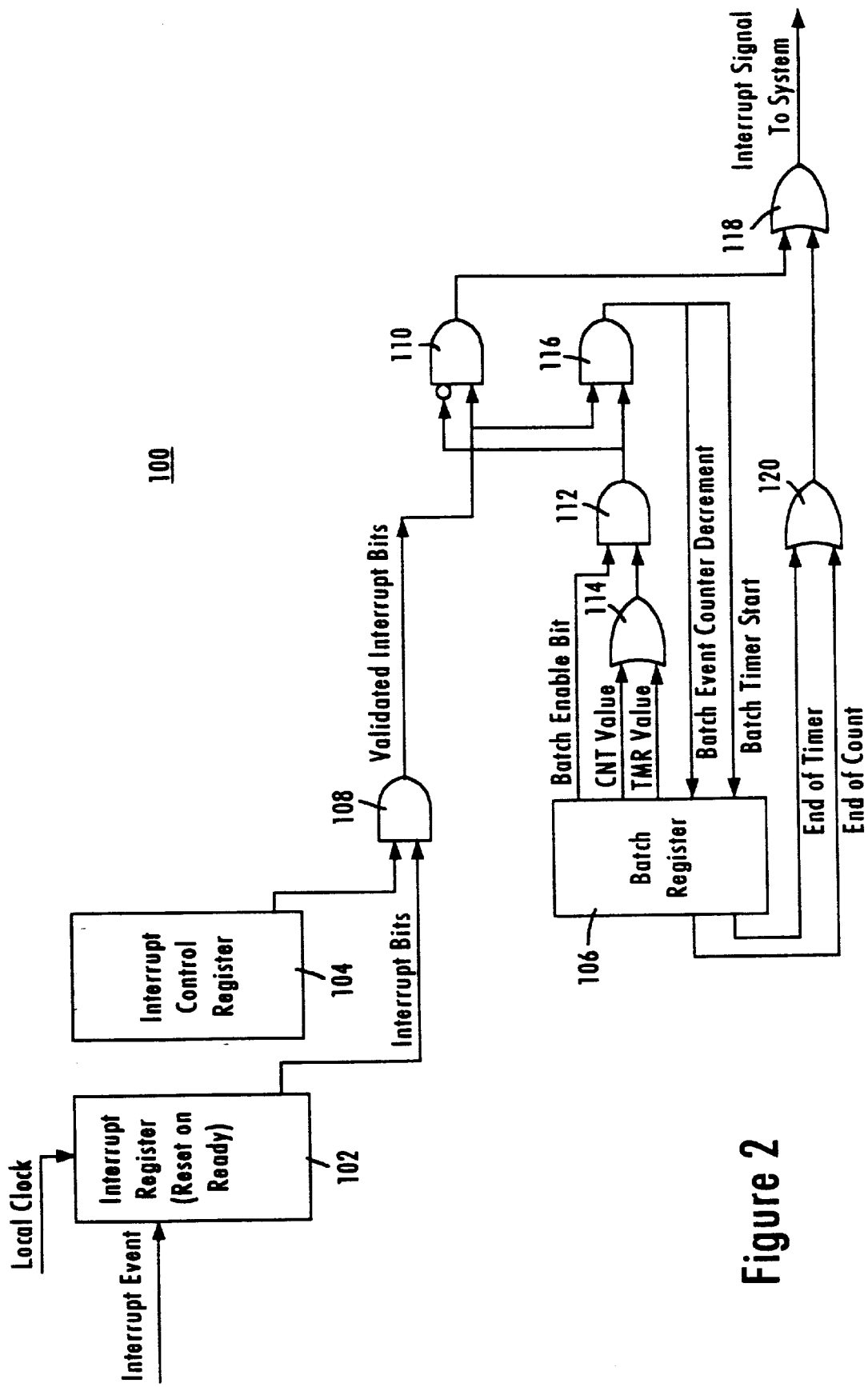
FIG. 2 is a block diagram of a batch mechanism of the present invention.

FIG. 2 illustrates a batch mechanism 100 arranged in the interrupt management block for handling interrupts in the real time and batch modes. As discussed in more detail later, the batch mechanism 100 includes an interrupt register 102, an interrupt clock register 104 and a batch register 106.

The interrupt register 102 contains interrupt bits set to 1 in response to various interrupt events. A local clock signal is supplied to the interrupt register 102 to provide timing of its operations.

For example, the interrupt register 102 may contain such interrupt bits as a transmit descriptor interrupt bit, a transmit free byte interrupt bit, a transmit idle interrupt bit, a transmit descriptors returned interrupt bit, a transmit frame complete interrupt bit, a receive DMA optimum interrupt bit, a receive frame complete interrupt bit, a receive descriptor interrupt bit, a receive slave optimum interrupt bit, and a receive out-of-descriptor interrupt bit.

The transmit descriptor interrupt bit is set to 1 after a predetermined transmit descriptor is processed. The predetermined transmit descriptor may indicate, for example, that data in the transmit buffer 18b are ready for transmission. The transmit free bytes interrupt bit is set to 1 when a pre-programmed number of bytes becomes free in the transmit buffer 18b. The transmit idle interrupt bit is set to 1 when there are no more transmit buffers in a transmit descriptor list. The transmit descriptors returned interrupt is set to 1 after a predetermined number of transmit descriptors have been processed. The transmit frame complete interrupt bit is set to 1 after a transmit frame has been successfully transmitted to the network or aborted due to error conditions. The receive DMA optimum interrupt is set to 1 after a predetermined number of initial bytes of a receive frame has been transferred via the DMA interface 16b to the system memory. The receive frame complete interrupt bit is set to 1 after an entire receive frame has been processed. The receive descriptor interrupt bit is set to 1 after a predetermined receive descriptor has been processed. The receive slave optimum interrupt bit is set to 1 after a predetermined number of initial bytes of a receive frame has been receive. Finally, the receive out-of-descriptor interrupt bit is set to 1 when the network interface 10 wants to transfer receive data to the system memory but there is no receive descriptor available in the descriptor list.

The interrupt control register 104 is programmed by the user to mask interrupt events that do not need to be considered by the CPU. The interrupt control register 104 contains a control bit for each interrupt bit in the interrupt register 102. When the control bit is set to 1, the corresponding interrupt bit is enabled to activate an interrupt request signal on the INTA/pin. When the control bit is deasserted, the interrupt event represented by the corresponding interrupt bit is excluded from CPU's consideration.

The batch register 106 is programmed for batching interrupts enabled by the interrupt control register 104. The interrupt batching allows an enabled interrupt bit to activate an interrupt request signal on the INTA/pin only when a predetermined number of interrupt event are detected, or a predetermined time period has elapsed since the last interrupt event was detected. As discussed in more detail later, the interrupt batching enables the network interface 10 to monitor specific interrupt events.

In addition to the registers, the batch mechanism 100 contains an AND gate 108 having inputs coupled to the interrupt register 102 and interrupt control register 104. The output of the AND gate 108 is connected to a non-inverting input of an AND-NOT gate 110. Inverting input of the AND-NOT gate 110 is coupled to the output of an AND gate 112 having a first input coupled to the batch register 106, and a second input coupled to the output of OR gate 114. Inputs of the OR gate 114 are connected to outputs of the batch register 106. The outputs of the AND gates 108 and 112 are coupled to inputs of an AND gate 116. The output of the AND gate 116 is supplied to inputs of the batch register 106. As will be discussed in more detail later, an interrupt request signal supplied to the INTA/pin is produced at the output of an OR gate 118 having a first input connected to the output of the AND gate 110, and a second input coupled to the output of an OR gate 120. Inputs of the OR gate 120 are connected to outputs of the batch register 106.

Figure 3:
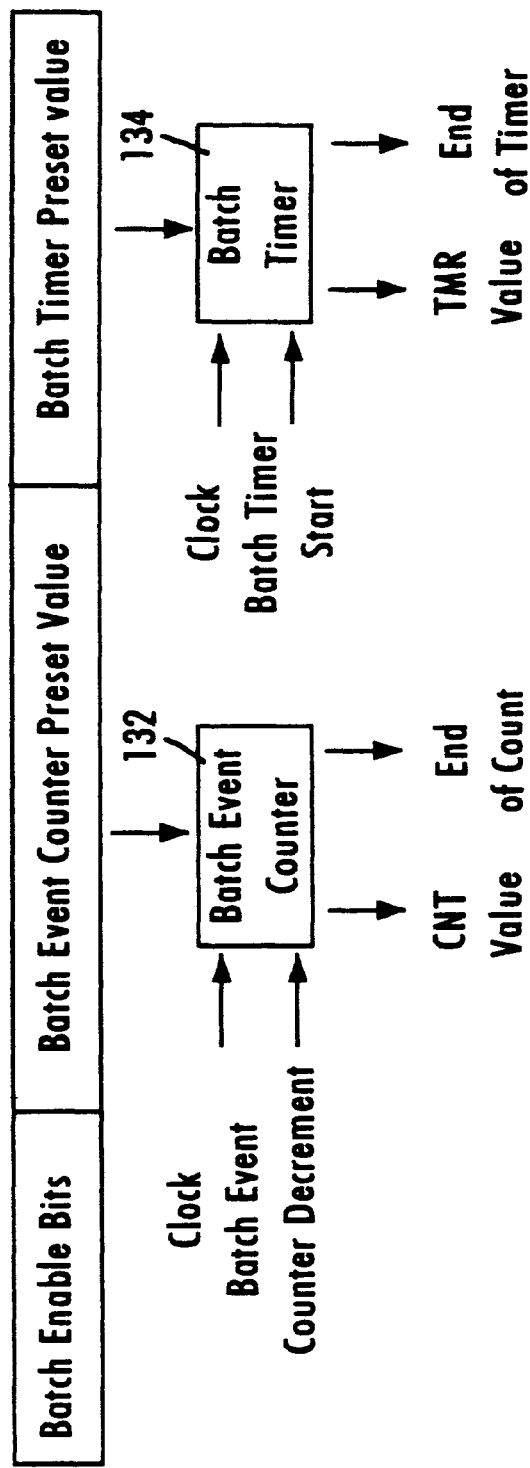
FIG. 3 is a block diagram of a batch register of the present invention.

As shown in FIG. 3, the batch register 106 may contain three fields. The first field includes batch enable bits corresponding to the interrupt bits stored in the interrupt register. The batch enable bits indicate which interrupt bits should be batched. When a batch enable bit in the batch register 106 is set to 1, the batching of the corresponding interrupt bit is enabled.

The batch enable bits may include a transmit descriptor interrupt batch enable bit that may enable the batching of the transmit descriptor interrupt bit, a transmit free bytes interrupt batch enable bit used to enable the batching of the transmit free byte interrupt bit, a transmit idle interrupt batch enable bit for the batching of the transmit idle interrupt bit, a transmit descriptors returned interrupt batch enable bit for batching of the transmit descriptors returned interrupt bit, a transmit frame complete interrupt batch enable bit corresponding to the transmit frame complete interrupt bit, a receive DMA optimum interrupt batch enable bit used for batching of the receive DMA optimum interrupt bit, a receive frame complete interrupt batch enable bit that enables the batching of the receive frame complete interrupt bit, a receive descriptor interrupt batch enable bit used for the batching of the receive descriptor interrupt bit, a receive slave optimum interrupt batch enable bit for the batching of the receive slave optimum interrupt bit, and a receive out-of-descriptor interrupt batch enable bit that enables the batching of the receive out-of-descriptor interrupt bit.

The second field of the batch register 106 comprises a batch event counter preset value. This value is programmed by the CPU to postpone an interrupt request signal in response to a selected interrupt event until the number of events corresponding to the batch event counter preset value is detected. The second field may contain the number of interrupt events of a given type that have to be captured prior to asserting an interrupt request signal on the INTA/pin. The interrupt event, response to which should be postponed, is selected when the batch enable bit corresponding to the interrupt event is set to 1.

The third field of the batch register 106 contains a batch timer preset value. This value is programmed by the CPU to define a delay time for delaying an interrupt request signal in response to a selected interrupt event. The interrupt event is selected when the corresponding batch enable bit is set to 1.

The batch event counter preset value is used to preset a batch event counter 132 to its initial value. The batch event counter 132 counts interrupt events selected for batching by the control bits in the interrupt control register 104 and the batch enable bits in the first field of the batch register 106. Each time when the selected interrupt event is detected by the batch mechanism, the batch event counter 132 is decremented and produces a cnt value signal indicating a current count value. A batch event counter decrement signal supplied to the batch event counter 132 represents an interrupt event selected for batching. When the batch event reaches its zero count, it produces an end of count signal. The batch event counter may be implemented by a synchronous counter controlled by the local clock signal.

The batch timer preset value is used to preset a batch timer 134 to its initial value. The batch timer 134 may be a counter decremented at a rate set by the local clock signal. A batch timer start signal is used to activate the batch timer 134. Each time when the batch timer 134 is decremented, it produces a tmr value signal indicating a current timer value. When the batch timer 134 reaches its zero count, it produces an end of timer signal.

Referring again to FIG. 2, the cnt value signal and the tmr value signals are supplied to the corresponding inputs of the OR gate 114. The end of count signal and the end of timer signal are provided to the corresponding inputs of the OR gate 120. The batch event counter decrement signal and the batch timer start signal are supplied from the output of the AND gate 116.

The batch mechanism 100 operates as follows. When an interrupt event occurs, the corresponding interrupt bit in the interrupt register is set to 1. This value is supplied to one input of the AND gate 108.

If the corresponding control bit in the interrupt control register 104 is set to 1, the AND gate 108 produces a validated interrupt bit at its output. If the control bit is equal to 0, then the interrupt bit does not pass to the output of the AND gate 108. As a result, the interrupt event is prevented from being considered by the CPU.

The validated interrupt bit is supplied to the non-inverting input of the AND-NOT gate 110, which has the inverted input coupled to the output of the AND gate 112. One input of the AND gate 112 is coupled to the batch register 106 to receive a batch enable bit. When the batch enable bit corresponding to an interrupt event is at a logic 0 level, the batch mechanism 100 handles the interrupt event in a real time mode of operation. In this mode, the output of the AND gate 112 is at a logic 0 level to allow the validated interrupt bit to pass to the output of the AND gate 110. As a result, logic 1 is supplied to the input of the OR gate 118 to produce an interrupt request signal sent to the CPU via the INTA/pin.

When the batch enable signal corresponding to an interrupt event is set to logic 1, the interrupt event is handled in a batch mode. In response to a cnt value signal from the batch event counter 132 or a tmr value signal from the batch timer 134, the AND gate 112 produces a logic 1 level at its output. As a result, the validated interrupt bit is prevented from passing to the output of the AND-NOT gate 110. Thus, the OR gate 118 produces no interrupt request signal in response to the interrupt event.

In the batch mode of operation, a logic 1 level at the output of the AND gate 112 allows the validated interrupt bit to pass to the output of the AND gate 116 to produce the batch event counter decrement signal supplied to the batch event counter 132 and the batch timer start signal supplied to the batch timer 134.

The batch event counter decrement signal causes the decrement of the batch event counter 132, which produces the cnt value signal indicating its current count. As discussed above, the batch event counter 132 is preset to its initial value representing a predetermined number of interrupt events to be batched. When the batch event counter 132 reaches its zero value, it produces the end of count signal supplied via the OR gate 120 to the OR gate 118. As a result, an interrupt request signal is sent to the CPU. Thus, the interrupt request signal is postponed until the number of interrupt events processed in the batch mode reaches the predetermined number represented by the batch event counter preset value.

The batch timer start signal produced at the output of the AND gate 116 activates the batch timer 134 decremented at a rate set by the local clock signal. As discussed above, the batch timer 134 is preset to its initial value representing a predetermined time interval. When the batch timer 134 reaches its zero value, it produces the end of timer signal supplied via the OR gate 120 to the OR gate 118 to initiate an interrupt request signal sent to the CPU. Thus, the batch timer 134 causes the interrupt request signal to be produced when a predetermined time interval has elapsed since the occurrence of an interrupt event processed in the batch mode.

As a result, in the batch mode of operation, an interrupt request signal is delayed until the number of interrupt events reaches a predetermined value, or until a predetermined time interval has elapsed since the occurrence of the last interrupt event. When an interrupt request signal is asserted, the network interface 10 waits until the CPU reads the interrupt bits in the interrupt register 102 and clears the interrupt register 102. Thereafter, the network interface 10 resets the batch event counter 132 and the batch timer 134 to their initial values.

A separate batch register 106 including the batch event counter 132 and the batch timer 134 may be provided for batching any selected group of interrupt events. For example, a transmit batch register may be provided for batching interrupt events associated with data transmission to the network, and a receive batch register may be provided for batching interrupt event associated with the reception of data from the network.

There, accordingly, has been described an interrupt management system that enables a user to handle interrupt events either in a real time mode of operation, or in a batch mode of operation. In the real time mode, an interrupt request signal is asserted in response to each interrupt event. In the batch mode an interrupt request signal is delayed until a predetermined number of interrupt events is detected, or until a predetermined time interval has elapsed since the last interrupt event is captured. In response to an interrupt event, the corresponding bit in an interrupt register is set to an active state. A control interrupt bit is provided in an interrupt control register for each interrupt to enable the activation of an interrupt request pin in response to the interrupt event. A batch enable bit is provided in a batch register for each interrupt event to enable the batching of the interrupt event.

In this disclosure, there are shown and described only the preferred embodiments of the invention, but it is to be understood that the invention is capable of changes and modifications within the scope of the inventive concept as expressed herein.

What is claimed is:

1. In a data communication network controlled by a host, an interrupt management system comprising:

an interrupt register for storing an interrupt bit asserted in response to an interrupt event, and a batch circuit responsive to a batch enabling bit provided for said interrupt event, for producing an interrupt request signal sent to said host in response to said interrupt bit when said batch enable bit is set to a first logic state, and for delaying said interrupt request signal when said batch enable bit is set to a second logic state.

2. The system of claim 1, wherein said interrupt request signal is delayed until a predetermined number of selected interrupt events is detected.

3. The system of claim 2, wherein said interrupt request signal is delayed until a predetermined time interval has elapsed since said interrupt event was detected.

4. The system of claim 1, further comprising an interrupt control circuit responsive to an interrupt control bit provided for said interrupt event, for preventing said interrupt bit from being supplied to said batch circuit when said interrupt control bit is set to a first logic state.

5. The system of claim 4, wherein said interrupt control circuit allows said interrupt bit to be supplied to said batch circuit when said interrupt control bit is set to a second logic state.

6. The system of claim 4, wherein said interrupt control circuit comprises an interrupt control register for supplying said interrupt control bit, and a first gate responsive to said interrupt bit and said interrupt control bit for producing a validated interrupt bit.

7. The system of claim 6, wherein said batch circuit comprises a batch register for supplying said batch enable bit.

8. The system of claim 7, wherein said batch circuit further comprises a batch event counter responsive to said validated interrupt bit for counting interrupt events.

9. The system of claim 8, wherein said batch circuit further comprises a batch timer activated by said validated interrupt bit for determining a time interval elapsed since the interrupt event was detected.

10. The system of claim 9, wherein said batch circuit comprises an OR gate responsive to signals provided by said batch event counter and said batch timer for producing said interrupt request signal.

11. The system of claim 1, wherein said batch enable bit is provided for the interrupt bit to indicate which interrupt bits should be batched.

12. In a data communication network controlled by a host, a method of interrupt management comprising the steps of:

asserting an interrupt signal in response to an interrupt event, producing an interrupt request signal sent to said host in response to said asserted interrupt signal when a batch enable signal provided for said interrupt event is in a first logic state, and delaying said interrupt request signal when said batch enable signal is in a second logic state.

13. The method of claim 12 further comprising the step of supplying an interrupt masking signal to prevent said interrupt request signal from being produced.

14. The method of claim 13, wherein said interrupt request signal is delayed until a predetermined number of selected interrupt events are detected.

15. The method of claim 13, wherein said interrupt request signal is detected until a predetermined time interval has elapsed since the interrupt event was detected.

16. The method of claim 12, wherein said batch enable signal is provided for the interupt signal to indicate which interupt signals should be batched.

17. The method of claim 13 further comprising the step of producing a validated interupt signal in response to said interupt signal, when said interupt masking signal enables activation of said interupt request signal.

* * * * *